(12) United States Patent
Schwarz et al.

(10) Patent No.: US 7,524,131 B2
(45) Date of Patent: Apr. 28, 2009

(54) ARRANGEMENT FOR RECEIVING A LOCKABLE AND RELEASABLE PUSH-IN ELEMENT AND METHOD

(75) Inventors: Helmut Schwarz, Weil der Stadt (DE); Bernhard Homner, Calw (DE)

(73) Assignee: SFS intec Holding AG, Heerbrugg (CH)

( * ) Notice: Subject to any disclaimer, the term of this patent is extended or adjusted under 35 U.S.C. 154(b) by 0 days.

(21) Appl. No.: 10/852,214

(22) Filed: May 25, 2004

(65) Prior Publication Data
US 2004/0240933 A1   Dec. 2, 2004

(30) Foreign Application Priority Data
May 27, 2003   (DE) .............................. 203 08 234 U

(51) Int. Cl.
B25D 17/04   (2006.01)
A44B 17/00   (2006.01)

(52) U.S. Cl. ........................ 403/319; 403/329; 24/581.1

(58) Field of Classification Search ................ 403/315, 403/316, 319, 326, 327, 329, 334, 373, 397, 403/374.1, 409.1, DIG. 11; 248/188.5; 16/261, 16/266, 268, 250, 251, 258; 24/573.09, DIG. 30, 24/DIG. 31, 581.1
See application file for complete search history.

(56) References Cited

U.S. PATENT DOCUMENTS

| | | | | |
|---|---|---|---|---|
| 4,187,035 A | * | 2/1980 | Colburn | ..................... 403/318 |
| 4,370,013 A | * | 1/1983 | Niitsu et al. | ................. 439/352 |
| 5,281,045 A | * | 1/1994 | Ichikawa | ..................... 403/329 |
| 5,761,768 A | * | 6/1998 | Wolf et al. | ..................... 16/225 |
| 6,599,054 B2 | * | 7/2003 | Ouimet | ..................... 403/374.1 |
| 2003/0007831 A1 | * | 1/2003 | Lian et al. | ................. 403/374.1 |

FOREIGN PATENT DOCUMENTS

| | | |
|---|---|---|
| DE | 9110175 | 11/1991 |
| DE | 19607786 | 9/1997 |
| DE | 29819377 | 3/1999 |
| FR | 2691216 | 11/1993 |
| GB | 2333321 | 7/1999 |

* cited by examiner

Primary Examiner—Victor MacArthur
(74) Attorney, Agent, or Firm—Volpe and Koenig, P.C.

(57) ABSTRACT

Detachable locking arrangement that includes a push-in element, a receiving member having an insertion opening structured and arranged to receive therein the push-in element and a locking device which is insertable into a clearance area of the receiving member. The clearance area is defined by a space arranged between the push-in element and an inner surface of the receiving member when the push-in element is inserted in the insertion opening. The locking device prevents removal of the push-in element from the receiving member when the push-in element is inserted within the insertion opening and when the locking device is inserted into the clearance area, thereby defining a locked position. The locking device is structured and arranged to automatically and releasably lock with the receiving member.

26 Claims, 10 Drawing Sheets

ARRANGEMENT FOR RECEIVING A LOCKABLE AND RELEASABLE PUSH-IN ELEMENT AND METHOD

CROSS-REFERENCE TO RELATED APPLICATIONS

The instant application claims priority under 35 U.S.C. §119 of German Application No. 203 08 234.6 filed on May 27, 2003, the disclosure of which is hereby expressly incorporated by reference in its entirety.

BACKGROUND OF THE INVENTION

1. Field of the Invention

The invention relates to releasable connection arrangement in which a push-in element can be connected with and released from a receiving shaft. The push-in element and the receiving shaft can each be joined to a component or themselves be the component.

2. Description of the Prior Art

Numerous connection arrangements are known which differ widely in their design, for example, bayonet arrangements and arrangements which function according to the "drawer" principle etc. All these arrangements are suitable for certain specific purposes.

SUMMARY OF THE INVENTION

The invention provides a new releasable connection arrangement in which a push-in element can be connected with and released from a receiving member while remaining in the same position.

The arrangement according to the invention is especially practical when used for hinged joints, where, for example, a swing-type lid is frequently removed from a luggage compartment. This occurs, e.g., during maintenance work in or on aircraft.

As a rule, the swing-lid and the compartment are permanently joined to hinge plates of a hinge by, e.g., screws or rivets. A permanent connection of this kind is impractical because the swing lid needs to be frequently temporarily removed.

In the arrangement according to the invention, the hinge plate connected to the luggage compartment can be designed as an insertion or push-in element. This push-in element can be introduced into a receiving member which is permanently and/or securely connected to the luggage compartment. This arrangement allows the push-in element to be fixed in position in a special way with the receiving member so as to form an automatic locking system. The locking system is also made releasable. In this way, the swing lid can always be easily detached from the luggage compartment. This is necessary for maintenance purposes (e.g., in aircraft environment) when the swing lid has to be removed, i.e., as in the case where it would otherwise take up too much space and hinder the work.

The invention also provides for a detachable locking arrangement comprising a push-in element, a receiving member having an insertion opening structured and arranged to receive therein the push-in element, and a locking device which is insertable into a clearance area of the receiving member. The clearance area is defined by a space arranged between the push-in element and an inner surface of the receiving member when the push-in element is inserted in the insertion opening. The locking device prevents removal of the push-in element from the receiving member when the push-in element is inserted within the insertion opening and when the locking device is inserted into the clearance area, thereby defining a locked position. The receiving member comprises a stop mechanism which engages the push-in element so as to prevent the push-in element from moving out of the insertion opening. The push-in element is prevented from moving further into the insertion opening along an insertion direction after being inserted in the insertion opening. The locking device is structured and arranged to automatically and releasably lock with the receiving member.

The locking device may be structured and arranged to automatically and releasably lock with the receiving member in the locked position. The push-in element may comprise at least one tapered surface. The receiving member comprises at least one internal tapered surface. The push-in element may comprise a tapered surface, and the receiving member may comprise a tapered surface, wherein the clearance area is defined by a space arranged between the tapered surfaces, whereby the tapered surfaces are oriented at an angle with respect to an insertion direction.

The locking device may be movably mounted to the receiving member and may be adapted to move between a retracted position wherein a stop surface of the locking device engages a stop surface of the receiving member and the locked position.

The push-in element may be removable from the insertion opening when the locking device is moved out of the locked position. The push-in element may be removable from the insertion opening when the locking device is moved to a retracted position from the locked position. The push-in element may be removable from the insertion opening when the locking device is at least partially removed from the clearance area. The push-in element may be insertable into the insertion opening from one side of the receiving member and the locking device is insertable into the clearance area from another side of the receiving member. The push-in element may be insertable into the insertion opening from one side of the receiving member and the locking device is insertable into the clearance area from an opposite side of the receiving member.

The stop mechanism of the receiving member may comprise a projecting portion arranged in a beginning area of the insertion opening. The projecting portion may prevent the push-in element from moving out of the insertion opening after the push-in element passes over the projecting portion. The push-in element may comprise a stop shoulder which engages with the projecting portion when the push-in element is fully inserted into the insertion opening.

The receiving member may comprise a generally rectangular cross-sectional shape. The push-in element may comprise a generally rectangular cross-sectional shape. The push-in element may comprise a generally U-shaped cross-section.

The locking device may comprise a spring arm having an engaging member which locks with an opening of the receiving member in the locked position. The locking device may comprise a spring arm having an engaging member which automatically locks with an opening in the receiving member in the locked position when the locking device is inserted into the clearance area. The locking device may comprise a movable locking projection which, in the locked position, engages with an opening of the receiving member, and which can disengaged from the opening by applying a force to the projection. Wherein, in the locked position, the locking device may be prevented from moving substantially within the clearance area. Wherein, when the movable locking projection may be disengaged from the opening, the locking device is movable within the clearance area.

The locking device may comprise a generally wedge-shaped member. The locking device may comprise a generally wedge-shaped plate. The locking device may comprise a generally planar non-parallel surfaces. The receiving member may comprise at least one guideway structured and arranged to guide movement of the locking device within the receiving member.

The receiving member may comprise oppositely arranged guideways structured and arranged to movably guide the locking device within the clearance area. The receiving member may comprise oppositely arranged internal projections structured and arranged to movably guide the locking device within the clearance area. The receiving member may comprise oppositely arranged internal projections structured and arranged to movably guide the locking device within the clearance area and at an angle which is not parallel to an insertion direction.

The insertion opening may comprise oppositely arranged guideways structured and arranged to movably guide the locking device within the clearance area.

The receiving member may comprise at least one guideway located in a rear portion of the receiving member and wherein the at least one guideway is structured and arranged to guide movement of the locking device within the receiving member.

The locking device may comprise at least one stop shoulder arranged on a side edge of the locking device.

The push-in element may comprise a step-shaped recess which is structured and arranged to engage with the stop mechanism of the receiving member. The stop mechanism may be arranged in a beginning area of the insertion opening and wherein the step-shaped recess is arranged in a rear area of the push-in element.

The push-in element may comprise outwardly projecting portions structured and arranged to contact a front portion of the receiving member when the push-in element is inserted into the receiving opening.

The invention also provides for a detachable locking arrangement comprising a push-in part, a receiving member having a first end, a second end, and an insertion opening structured and arranged to receive therein the push-in part via the first end, and a locking device which is linearly slidably insertable into a clearance space from the second end of the receiving member. The locking device prevents removal of the push-in part from the receiving member when the push-in part is inserted within the insertion opening and when the locking device is inserted into the clearance area, thereby defining a locked position. The locking device allows removal of the push-in part from the receiving member when the locking device is moved at least partially out of the clearance area, thereby defining a unlocked position. The locking device is structured and arranged to automatically and releasably lock with the receiving member.

The clearance space may be defined between an outer surface of the push-in part and an inner surface of the receiving member when the push-in part is inserted in the insertion opening. The receiving member may comprise a stop mechanism which engages the push-in part so as to prevent the push-in part from moving out of the insertion opening. The push-in part may be prevented from moving further into the insertion opening along an insertion direction after being inserted in the insertion opening.

The invention also provides for a method of detachably locking a push-in part to a receiving member having an insertion opening structured and arranged to receive therein the push-in part, wherein the method comprises inserting the push-in part into the insertion opening of the receiving member along an insertion direction, limiting, with a stop mechanism, movement of the push-in part within the insertion opening, moving a locking device from an initial position to a locked position inside of a clearance space, wherein, in the locked position, the locking device automatically and releasably locks with the receiving member, moving the locking device out of the locked position, and removing the push-in part from the receiving member, wherein the locked position prevents removal of the push-in element

BRIEF DESCRIPTION OF THE DRAWINGS

The present invention is further described in the detailed description which follows, in reference to the noted plurality of drawings by way of non-limiting exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
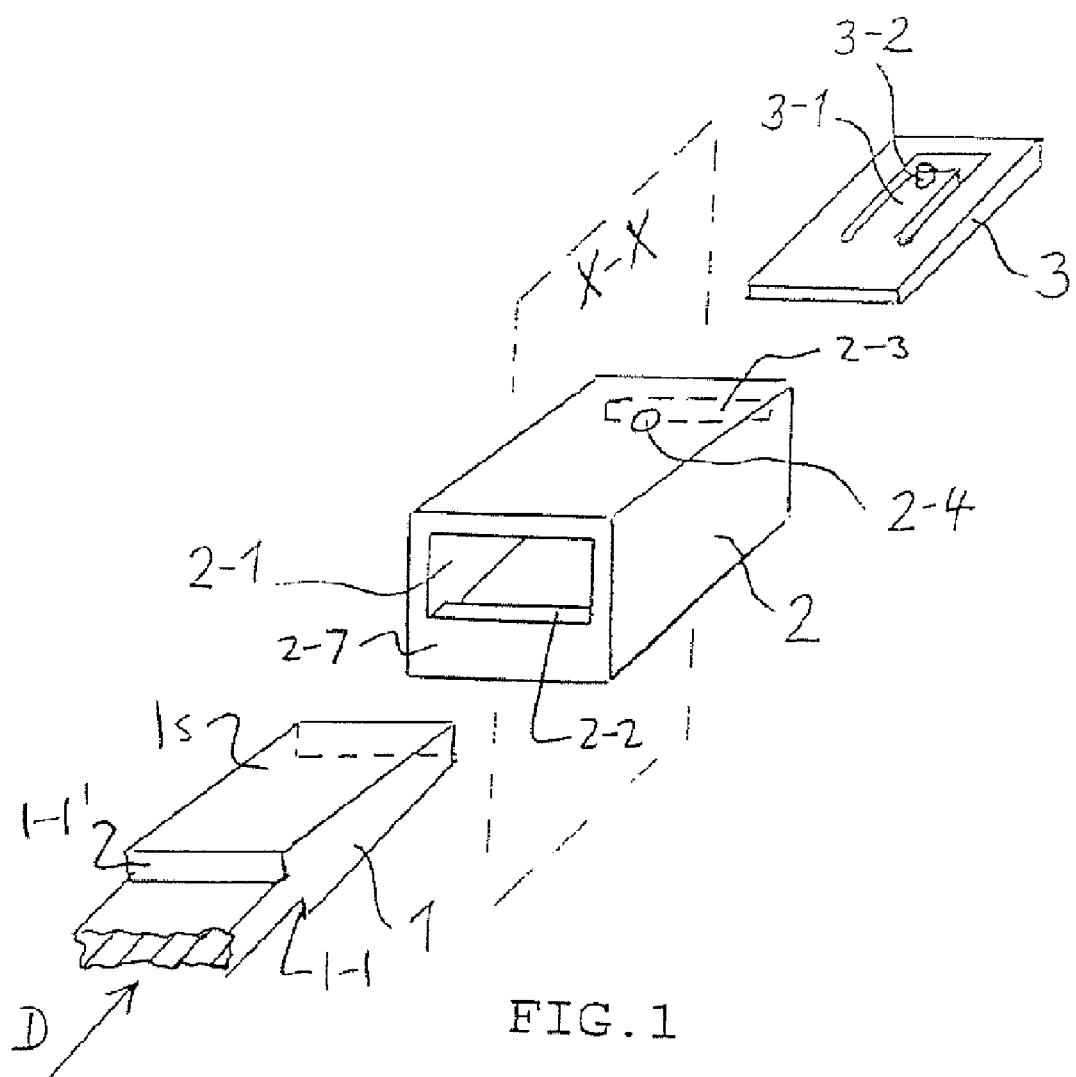
FIG. 1 shows a diagrammatic perspective view of the receiving arrangement in an unassembled state according to the invention.

FIG. 1 shows a diagrammatic perspective view of the receiving arrangement according to the invention. The arrangement includes a push-in part 1, a receiving member 2 having an opening 2-1 which accommodates and/or receives therein the push-in part 1, and a removable clearance or locking element 3. The push-in part 1 has one or more rear stop surfaces 1-1 which engages with one of more stop surfaces or projections 2-2 on the receiving element 2. In this way, when the push-in part 1 is fully inserted within the receiving member 2, the push-in part 1 is prevented from being removed (or from moving in a direction opposite direction D) by these stop surfaces. The locking element 3 has a plate-like design and includes at least one deflecting or spring arm 3-1. This arm 3-1 can be integrally formed with the locking element 3. A projection or tappet 3-2 projects from a upper surface of the locking element 3. This projection 3-2 is configured to engage with or project into an opening 2-4 of the receiving member 2 when the locking element 3 is fully inserted into the receiving member 2. As can be seen in FIG. 1, the push-in part 1 also has one or more tapered surfaces 1s which extend from the stop surfaces 1-1, 1-1' to a free end of the push-in part 1. FIG. 1 also illustrates that the push-in part 1 slides into the opening 2-1 from a side of the receiving member 2 which is opposite a side of the receiving member 2 which receives therein the locking element 3. In this embodiment, the receiving member 2 can utilize a large opening 2-1 for removably receiving the push-in part 1 and a small opening 2-3 which allows the locking element 3 to be removably slidably inserted in the receiving member 2. This arrangement is designed so that the push-in part 1 cannot pass completely through the receiving member 2 upon insertion and so that the locking element 3 cannot pass completely through the receiving member 2 when it is inserted into the receiving member 2.

Figure 2A:
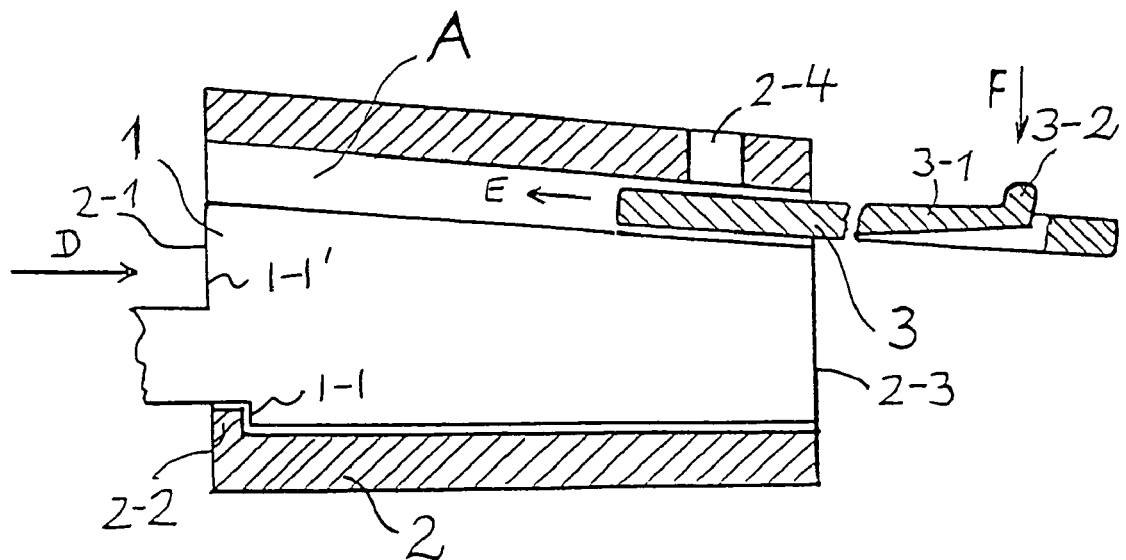
FIG. 2A shows a sectional view of the receiving arrangement according to the invention for the cutting plane X-X in FIG. 1. In this diagram, the push-in element is located completely in the receiving member, while the clearance element is partially inserted therein and partially projects out of the receiving member.

FIG. 2A shows a sectional view of the receiving arrangement according to the invention for the cutting plane X-X in FIG. 1. The push-in element 1 is shown fully inserted into the receiving member 2. The clearance or locking element 3 is shown partially inserted into a clearance area A defined by surfaces 1s and 2s. Although in this position, the push-in part 1 is prevented from moving out (opposite direction D) of the receiving member 2 by surfaces 1-1 and 2-2, the push-in part 1 is not yet locked to the receiving member 2. In this position, the locking element 3 is slid into area A along an insertion direction E into the receiving member 2 and partially projects out of the receiving member 2.

Figure 2B:
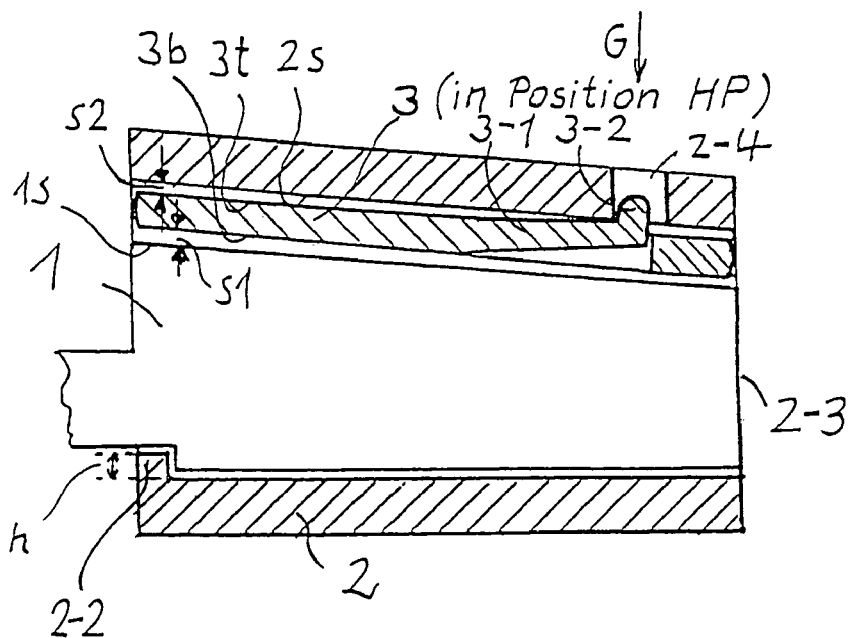
FIG. 2B shows a sectional view of the receiving arrangement according to the invention for the cutting plane X-X in FIG. 1. In this diagram, the push-in element and the clearance element are located and/or inserted completely in the receiving member. The arrangement is thus in the locking position.

FIG. 2B shows a sectional view of the receiving arrangement of FIG. 2B in the locked position. As can be seen in this figure, the push-in element 1 and the clearance or locking element 3 are located completely in the receiving member 2. Moreover, the projection 3-2 has penetrated into the opening 2-4 under the biasing force of the spring arm 3-1 thereby preventing the locking element 3 from moving further along direction E or from moving backwards (i.e., opposite direction E) out of the area A. Because in this position the locking element 3 takes up a substantial portion of the area A, the push-in part 1 is prevented from moving vertically a sufficient amount which would allow the surface 1-1 to clear the projection 2-2, i.e., the push-in part 1 can only move vertically or upwards an amount which is equal to the clearances s1 and s2 and these clearances are less than the height "h". Also, because in this position the locking element 3 takes up a substantial portion of the area A, the push-in part 1 is prevented from moving further along direction D. This is because the surface 1s will contact and/or frictionally engage the locking element 3 as the clearances s1, s2 are essentially eliminated by this movement. Additionally, as explained above, the push-in part 1 is prevented from moving back and opposite direction D because the surface 1-1 will contact and/or frictionally engage the projection 2-2. The arrangement can thus be said to be in the locking or locked position.

The arrangement thus utilizes a push-in element 1, a receiving member 2 which includes a front insertion opening 2-1 for receiving the push-in element 1 along an insertion direction D. A clearance element 3 is re-locatable and/or removably mountable in the receiving member 2. The push-in element 1 may be any desired separate component, or, as with the receiving member 2, it can be joined to a component such as, e.g., a static or movable component and/or a portion of an aircraft.

Figure 3:
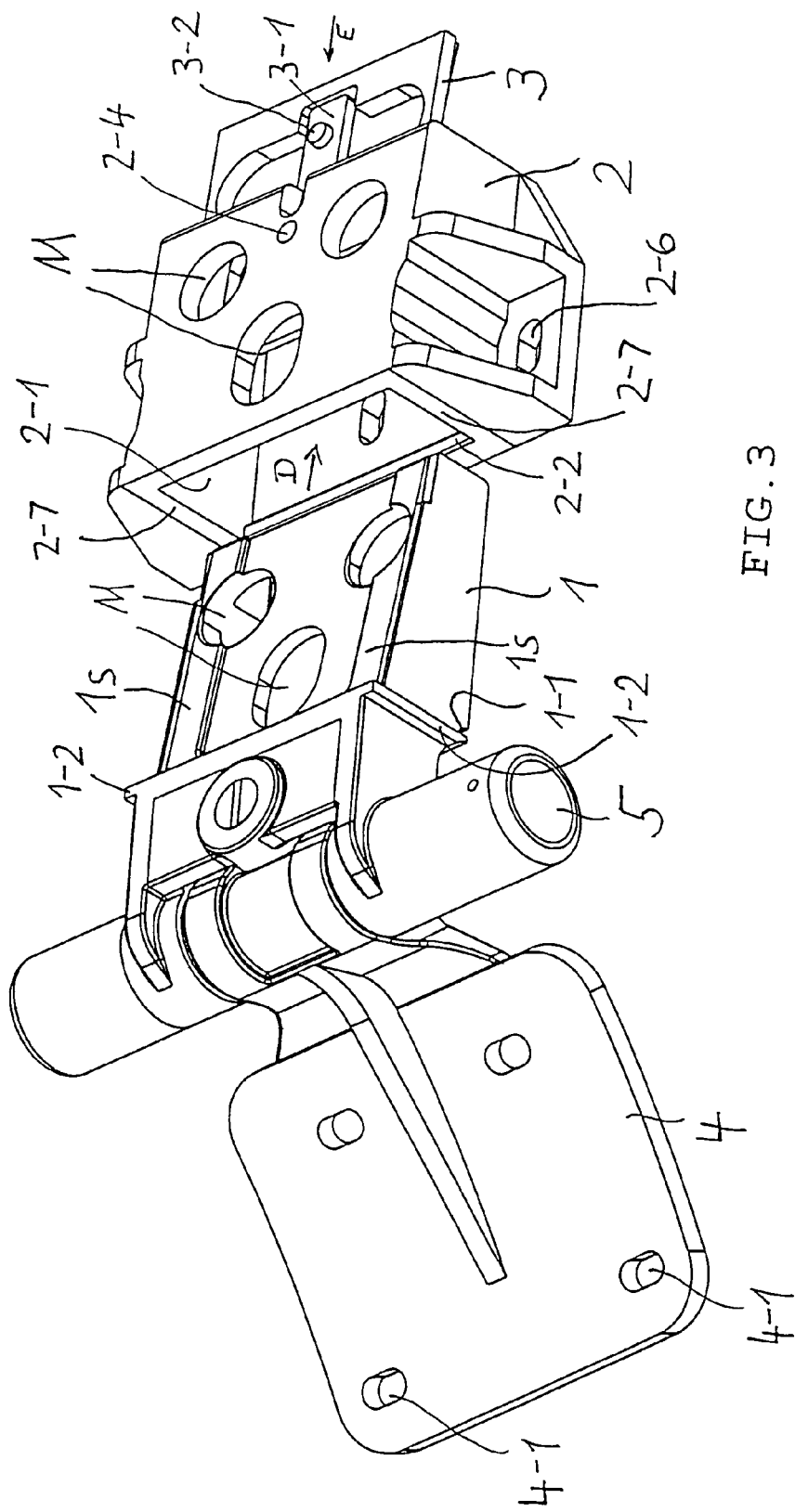
FIG. 3 shows a perspective view of a receiving arrangement according to the invention wherein the push-in element has the form of one of the hinge plates of a hinge having two hinge plates.

FIG. 3 shows one non-limiting practical embodiment of the arrangement according to the invention. Here, it can be seen that the push-in element 1 is formed as part of a hinge having a hinge member or axis 5 and two movable plates 1 and 4. The push-in part 1 can, in particular, be formed as part of a first hinge plate 1. The first hinge plate 1 is insertable into the receiving member 2. Once inserted into the receiving member 2, the arrangement is locked. The clearance element 3 in this embodiment also utilizes a spring arm 3-1 with an engaging tappet or projection 3-2. This projection 3-2, in the locking position, hooks or penetrates into a recess or opening 2-4 of the receiving member 2. In the locking position, the push-in element 1 can no longer work loose or disengage from the receiving member 2. Of course, as with the previously described arrangement, this locking connection can be released by removing the locking element 3.

The receiving member 2 and the second hinge plate 4 can be fixed and/or secured permanently to a luggage compartment and/or to a swing lid by, e.g., screws or other connection devices.

In order to place the arrangement shown in FIG. 3 in the locking position, the push-in element 1 is inserted in direction D over the threshold 2-2 and into the receiving member (in the same as is shown in FIGS. 2A and 3). When the push-in element 1 is fully or completely inserted into the receiving member 2, a clearance area A is formed between the top side or surfaces 1s of the push-in part 1 and an upper inside surface 2s of the receiving member 2. The clearance element 3 is sized and configured to be slide into or movably positioned in this clearance area A. During the insertion of the push-in element 1 into the receiving member 2, the clearance element 3 can be initially positioned as shown in FIG. 2A so that it cannot impede the insertion of the push-in element 1. In this embodiment, the design of the clearance element 3 and receiving member 2 is such that the clearance element 3 cannot be easily fully removed from the receiving member 2. Instead, the locking member 3 slides and/or moves between a retracted position (see e.g., FIGS. 3 and 6) and a fully inserted position (similar to that shown in e.g., FIG. 2B).

Once the push-in part is inserted into the receiving member 2, the clearance element 3 can be moved along direction E until it takes up a locking position HP, i.e., a position wherein the locking element 3 is arranged between the push-in element 1 and the upper wall of the member 2 (see FIG. 2B). In this locking position HP, the push-in element 1 is fixed in position within the receiving member 2.

The locking position results from a wedge effect between the push-in element 1, which has a cone-shape or one of more tapered surfaces, and a narrow opening of the receiving member 2, and because of contact between the edges 1-2 and an edge or front surface of the opening 2-1 (see FIG. 3). The push-in part 1 is thus prevented from moving further along direction D. Additionally, the push-in part 1 is prevented from moving in the direction opposite to direction D because the threshold 2-2 functions as a stop and engages the step or stop surface 1-1 of the push-in element 1. Because of a vertical clearance between elements 1, 2 and 3 is essentially equal to s1+s2 (see FIG. 2B), the push-in part 1 cannot move upwards more than a height "h" of the threshold 2-2. This is because the invention provides for the height "h" to be greater than the total clearance (i.e., s1+s2).

The invention also provides for other variations in the arrangement such as those which do not utilize a wedge effect. In this case, a rear-end wall (not shown but in the area of opening 2-3) in the receiving member 2 may (for example) act as a stop.

When the clearance element 3 is positioned in the locking position HP, it locks into the receiving member automatically. In this regard, the clearance element 3 has a spring arm 3-1 with an engaging tappet 3-2 located at a free end of the arm 3-1. When the clearance element 3 is moved in direction E, the engaging tappet 3-2 and the spring arm 3-1 are caused to be deflected along direction F as it enters the receiving member 2. When fully inserted into the receiving member 2, the engaging tappet 3-2, through further movement of the clearance element 3, moves under the opening 2-4 in the upper wall of the receiving member 2 and then engages and/or penetrates (through the spring force of arm 3-1) automatically into the opening 2-4. The arrangement is thus locked. In order to unlock the arrangement, one need only move or push the engaging tappet 3-2 out of opening 2-4 along direction G (e.g., by way of a tool) while also moving the clearance element 3 at the same time along a direction which is opposite direction E to the retracted position shown in FIGS. 3 and 6.

The arrangement, and in particular the configuration of the elements 2 and 3, is designed so that the spring arm 3-1 and tappet 3-1 are automatically deflected in direction F during movement along direction E. The user need not apply any force to the spring arm 3-1 and he may simply apply a force to the member 3 only along direction E. However, the invention also contemplates an arrangement, and in particular the configuration of the elements 2 and 3, wherein the spring arm 3-1 and tappet 3-1 must be deflected in direction F during movement along direction E by a user in order to ensure that the member 3 is locked within the member 2. In such an arrangement, the user would need to apply both a force to the spring arm 3-1 (in direction F) as well as a force to the member 3 along direction E to cause the member 3 to be fully inserted and locked into member 2.

A particularly advantageous version of the arrangement provides that the push-in element 1 and the receiving member 2 each have one or more angled and/or tapered surfaces 1s and 2s. These surfaces 1s and 2s may be generally parallel to each other in the locked position. The tapered surface 1s allows the push-in element 1 to have a truncated cone shape. The opening of the receiving member 2 with its wedge-shaped tapered surface 2s can act as a limiting stop for the tapered push-in element 1.

The arrangement according to the invention may utilize any desired mating cross section or profile cross sections. That is, the push-in element 1 can have a rectangular, round or other cross-sectional shape. Of course, the receiving member 2 (and also element 3) may need to have a corresponding shape in order to properly receive the push-in element 1. Such arrangements can also be utilized with or without the parts 1 and 2 having any tapered surfaces.

Similarly, the clearance area A does not necessarily have to have a rectilinearly shape. In order to achieve the locking effect, locking elements other than those which function with a sliding-type clearance may be used. In this respect, any element would be suitable as long as it is capable fixing the push-in element 1 in a locked position in the receiving member 2. This may include elements which are eccentrically shaped or which are wedge-shaped. The invention also contemplates clearance elements 3 which act on the push-in element 1 within the receiving member 2, either in one or more small areas only or over a larger area of the push-in element 1 in order to fix it in a locking position.

As explained above, in locking position HP, the push-in element 1 is prevented by the threshold or projection 2-3, which acts as a stop, from moving contrary to insertion direction D and out from within the receiving member 2. Additional stop arrangements are also possible for preventing the push-in part 1 from moving further along direction D within the receiving member 2 such as, e.g., a tappet or projection connected to the push-in element 1 (not shown). Such a configuration would allow the projection to hook into a recess in the wall of the receiving member 2 (or vice versa) in order to prevent any further movement in direction D after reaching the locking position.

The engagement connection (i.e., engaging tappet 3-2/opening 2-4) can also utilize more than one spring arm 3-1 and/or projection 3-3, as well as more than one opening 2-4. The engagement connection (i.e., engaging tappet 3-2/opening 2-4) can also be replaced by other known types of engagement connections without leaving the scope of the invention.

As explained above, FIG. 3 shows a perspective view of a preferred receiving arrangement according wherein the push-in element 1 represents one of the hinge plates of a hinge having two movably mounted plates 1 and 4. This embodiment represents a special product-specific version. For reasons of simplicity, the reference symbols corresponding to similar features from FIG. 1 etc., have been retained in FIG. 3.

Figure 4B:
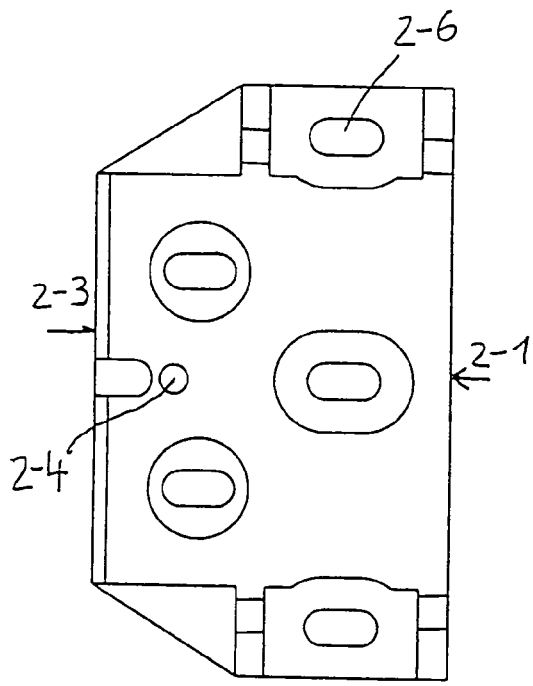
FIG. 4B shows the top view of the receiving member shown in FIG. 4A.
Figure 4C:
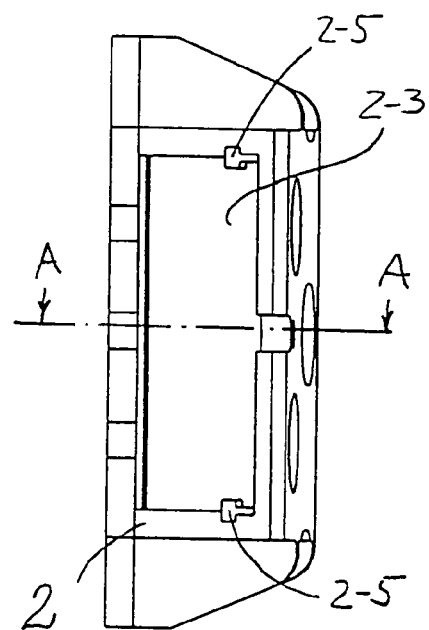
FIG. 4C shows the rear side view of the receiving member shown in FIG. 4A.
Figure 4A:
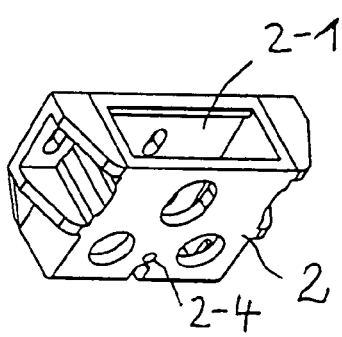
FIG. 4A shows a perspective view of a receiving member used in the embodiment shown in FIG. 3. The figure shows a diagonal view of a top side and illustrates the receiving opening.
Figure 4D:
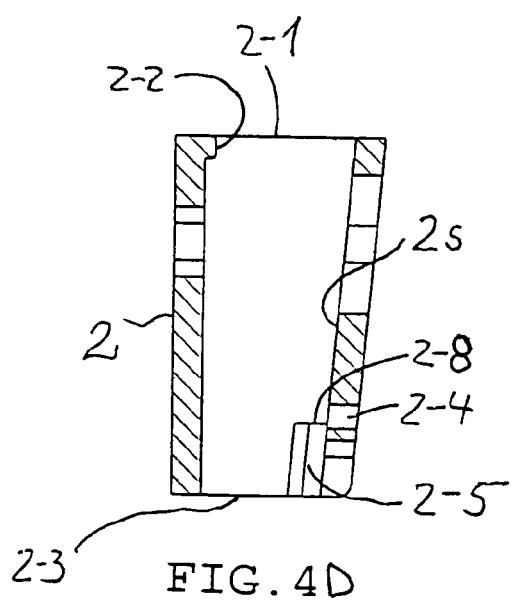
FIG. 4D shows the sectional view of the receiving member shown in FIG. 4C along cutting plane A-A.
Figure 9:
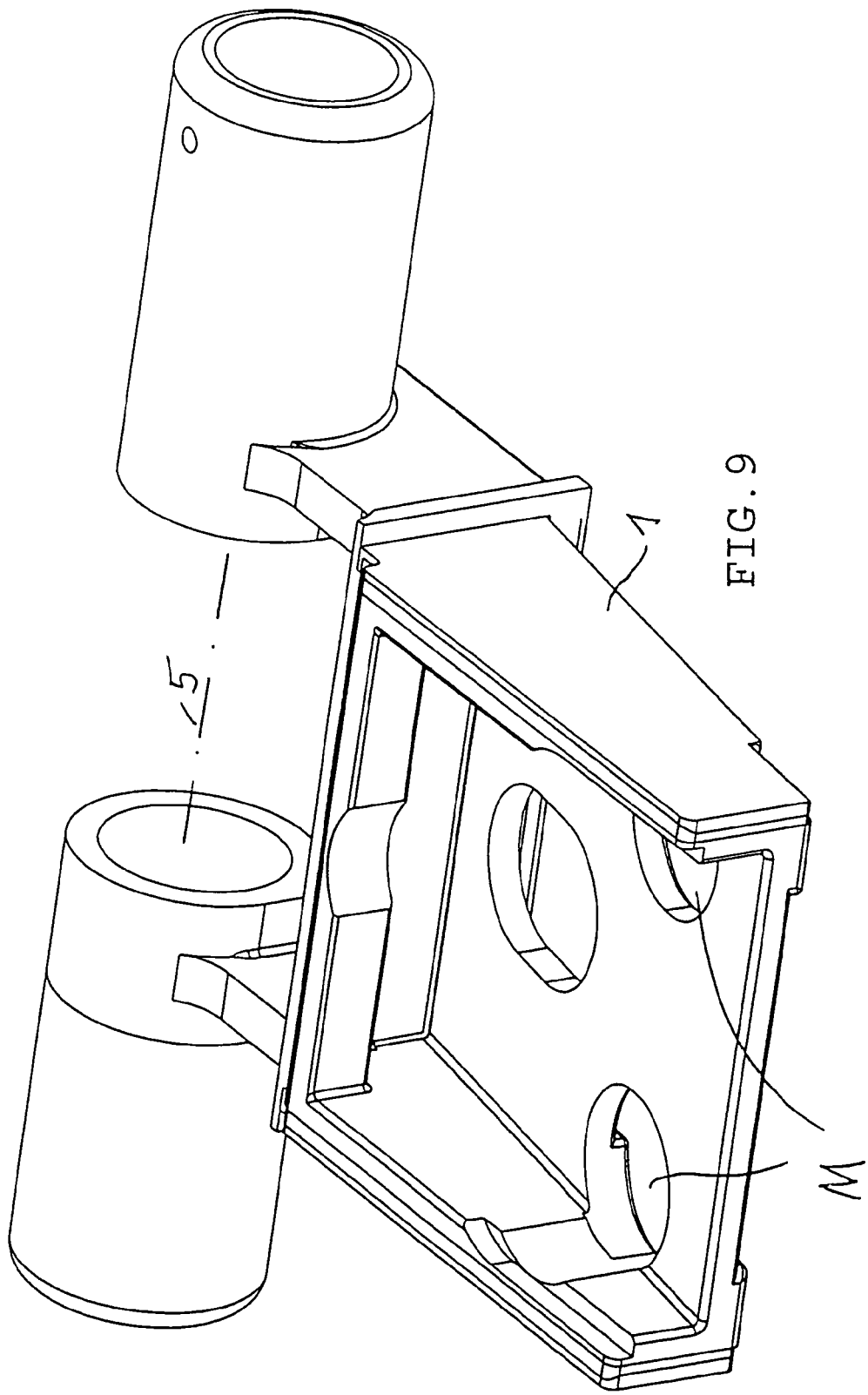
FIG. 9 shows a perspective view of the push-in element used in the embodiment shown in FIG. 3 with diagonal view of a bottom side thereof and illustrate that the push-in element has a U-profile section.

The push-in element 1 used in this embodiment has a shape similar to a truncated cone and also has a U-shaped profile cross section (see FIG. 9). The push-in part 1 has on its top side, two slideways 1s which running diagonally downwards in direction D towards a free edge. These slideways 1s act as engaging surfaces for the locking element 3. The locking element 3 is inserted through the opening 2-1 into the receiving member 2 and into a position in which it partially projects from a rear opening 2-3 (see FIG. 4C, FIG. 5) of the receiving member 2 (as shown in FIG. 3).

Figure 8A:
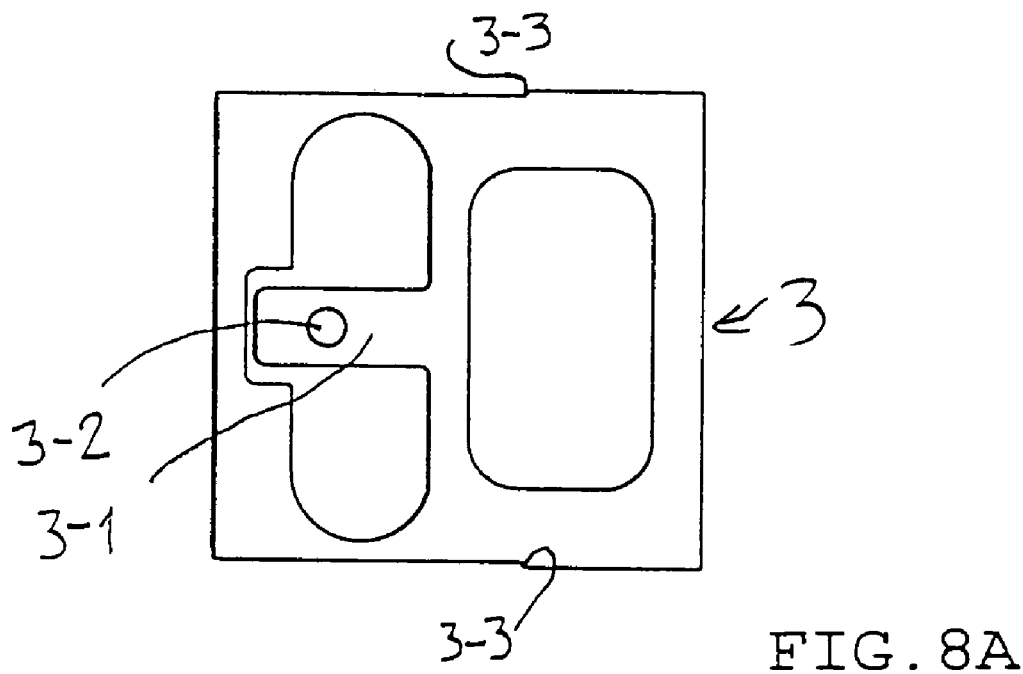
FIG. 8A shows a top view of the clearance element shown in FIG. 7.
Figure 8B:
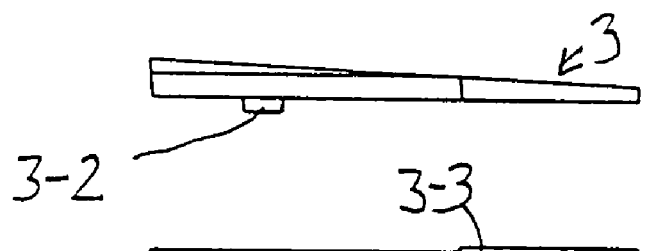
FIG. 8B shows a side view of the clearance element shown in FIG. 8A.
Figure 8C:
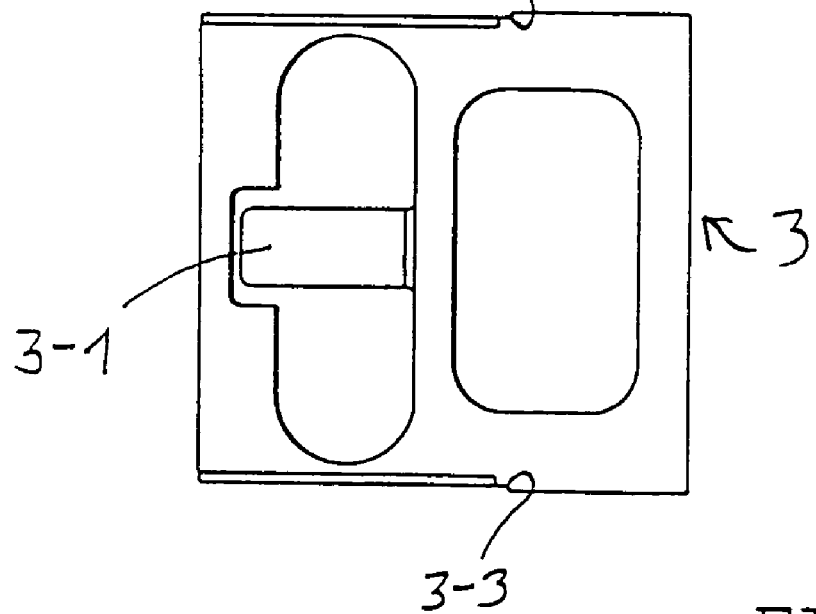
FIG. 8C shows a bottom view of the clearance element shown in FIG. 8A.

As can be seen in FIGS. 8A-C, the clearance element 3 may also have a wedge shape whose cross section tapers in a direction E. The clearance element 3 can be guided between guideways 2-5 in the receiving shaft 2 (see FIGS. 4C, 4D, 5 and 6).

As can be seen in FIGS. 4A-D, 5 and 6, stops 2-8 in the receiving member 2 are configured to engage with step-shaped shoulders 3-3 arranged on edges of the clearance element 3. This engagement prevents the locking or clearance element 3 from being pushed completely out of the rear opening 2-3 in the receiving member 2.

When inserting the clearance element 3 into the receiving member 2 in the initial retracted position shown in FIG. 3, it must be ensured (by pressing the spring-arm 3-2 down) that the engaging tappet 3-2 does not engage in the opening of the receiving member 2 while it is being moved in its path along direction E. As soon as the clearance element 3 is in the position shown in FIG. 3, the push-in element 1 can be inserted through the opening 2-1 in the receiving shaft 2. This action requires moving the push-in element 1 over the threshold 2-2 until this threshold 2-2 hooks or moves into a transverse groove or shoulder 1-1 of the push-in element 1. Further insertion of the push-in element 1 into the receiving member 2 is prevented, however, because the push-in element 1 also includes outwardly projecting edge parts or shoulders 1-2 which contact a front surface 2-7 of the opening 2-1 of the receiving member 2.

When the push-in element 1 is in the inserted position, the clearance or locking element 3 can be pushed in direction E into the free cavity defined between the upper side 1s of the push-in element 1 and the inner side 2s of the upper wall of the receiving member 2. This causes the upwardly pointing engaging tappet 3-2 on the spring arm 3-1 to be pressed or forced downwards through the top inside of the receiving member 2 until, by further movement of the clearance element 3 in direction E, the arm 3-1 and tappet 3-2 is moved under the opening 2-4 where the tappet 3-2 locks into position.

As already explained, the push-in element 1 can have the form of a hinge plate of a hinge which uses two hinge plates 1 and 4 movably mounted about a common hinge axis 5. In this regard, the invention contemplates that the hinge plate 1 is attached to, e.g., a swing lid, while the receiving member 2 is attached to, e.g., a luggage box. This attachment can occur by, e.g., by screws or similar connection devices. In this regard, the devices have holes 4-1 and 2-6 provided for this purpose.

The receiving member also includes openings M. Similarly, the push-in element 1 also has openings M. These openings can be aligned with one another when the push-in element 1 is inserted within the receiving member 2. These openings may be utilized to facilitate installation under certain circumstances.

Figure 5:
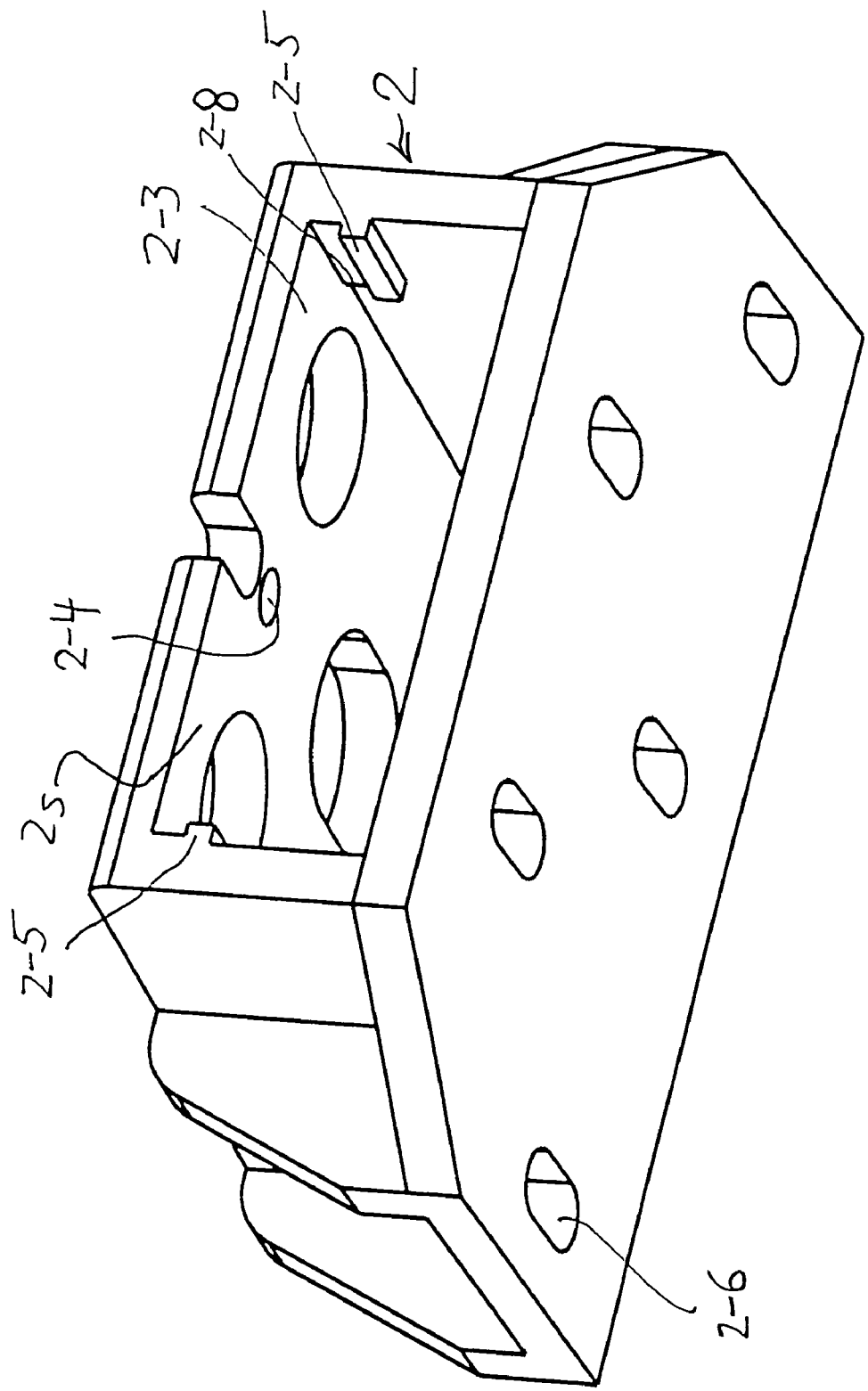
FIG. 5 shows a perspective view of the receiving member shown in FIG. 3 with a diagonal view illustrating its bottom side and its rear opening.
Figure 6:
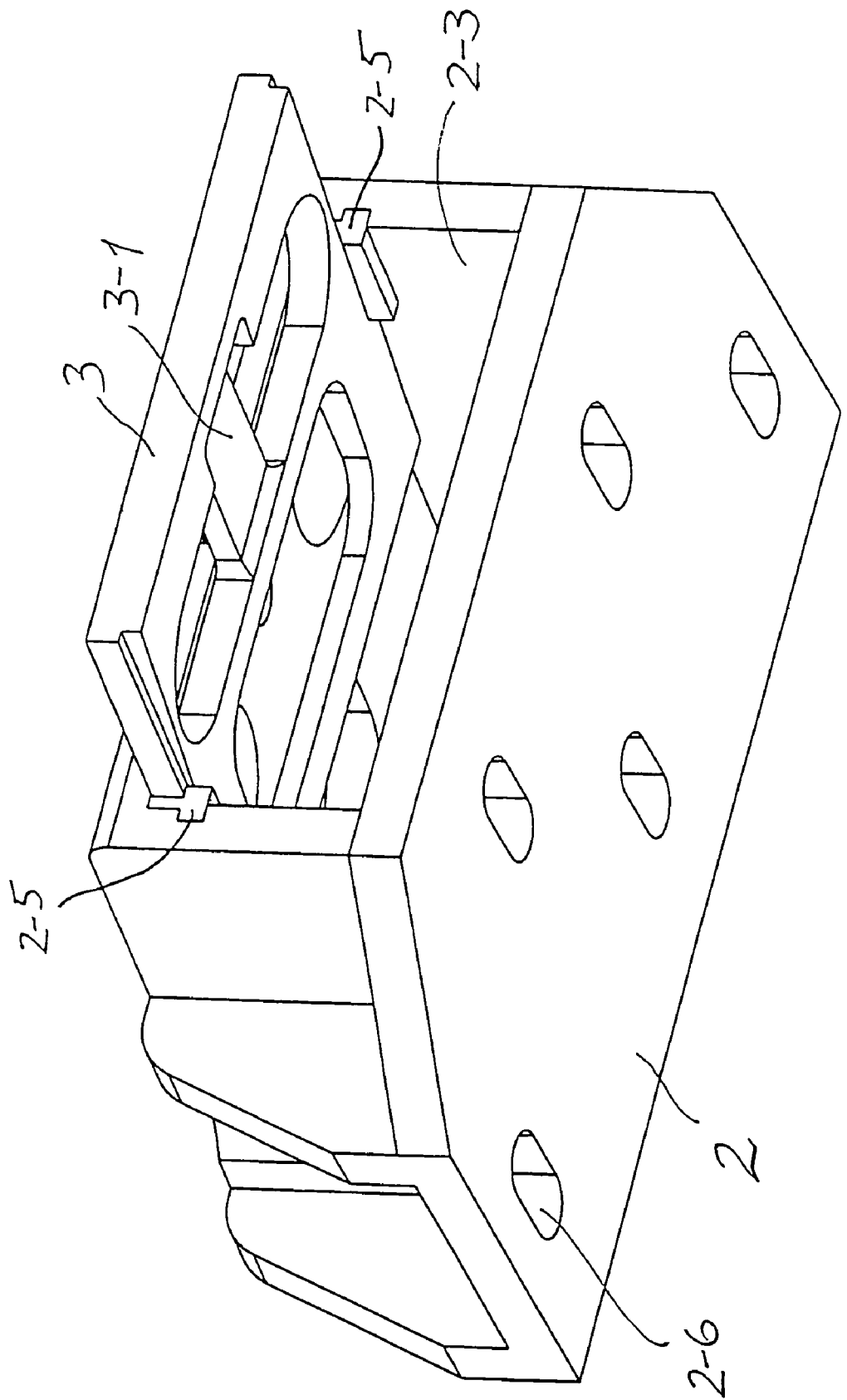
FIG. 6 shows a perspective view of the receiving member shown in FIG. 5 and illustrating the clearance element in a partially inserted state.

FIGS. 5 and 6 show perspective views of the receiving member 2 used in the embodiment shown in FIG. 3. Here, it can be seen how the rear opening 2-3 is configured to accommodate the locking element 3 between the guideways 2-5 and surface 2s. The clearance element 3 is guided linearly by the oppositely arranged guideways 2-5.

Figure 7:
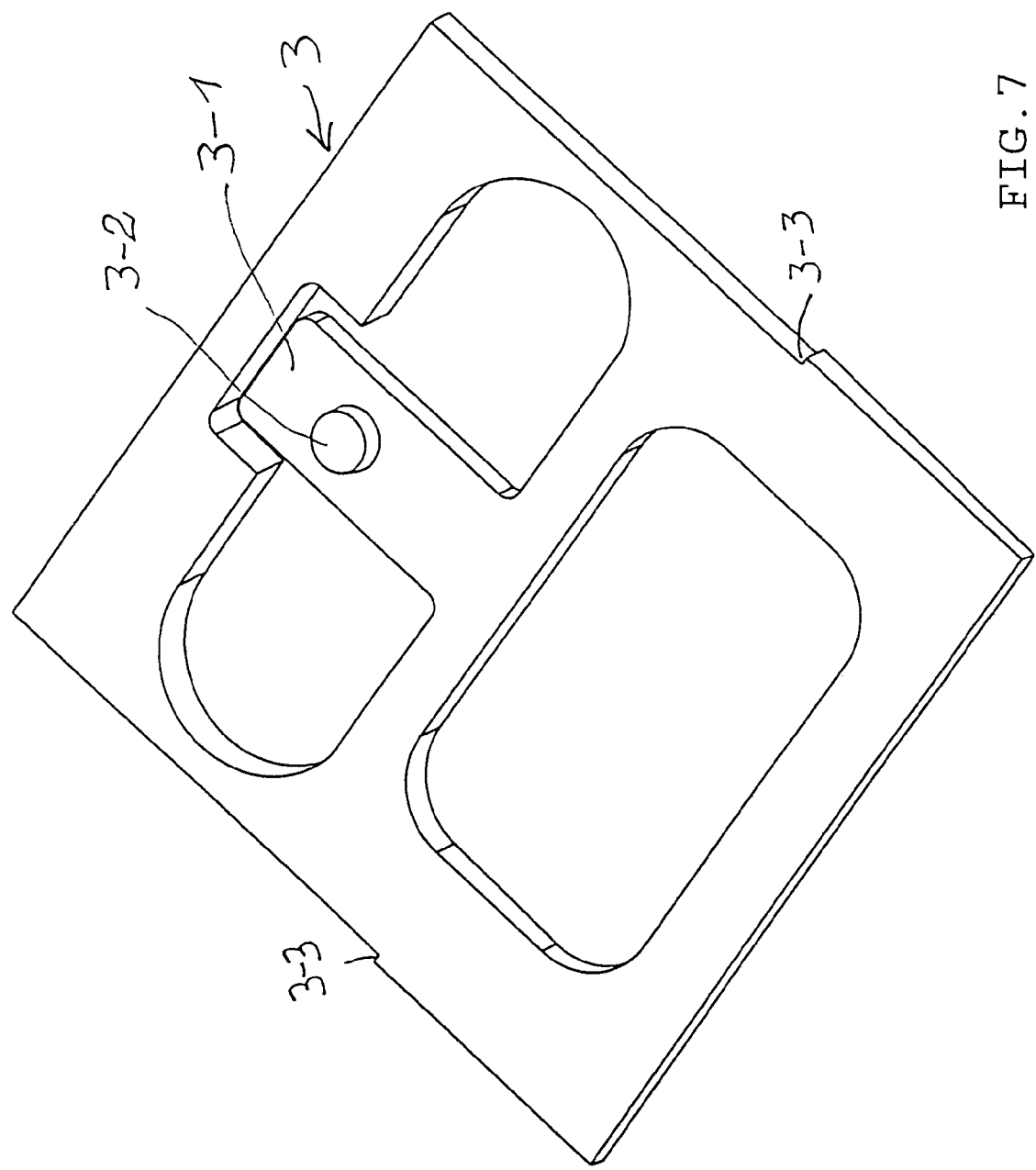
FIG. 7 shows a perspective view of the clearance element used in the embodiment shown in FIG. 3.

FIG. 7 shows a perspective view of the clearance or locking element 3 used in the embodiment shown in FIG. 3. FIG. 8A shows the top view of the locking element 3, FIG. 8B shows a side view thereof and FIG. 8C shows the bottom view of the clearance element 3. As can be seen in these figures, the element 3 is a plate-like member having openings and a spring arm 3-1. A centrally arranged circular projection 3-2 is integrally formed with the spring arm 3-1. The element 3 also includes stop shoulders 3-3 arranged on oppositely arranged parallel edges. As explained above, these stop shoulders 3-3 are configured to engage with stop surfaces 2-8 of the receiving member 2.

FIG. 9 shows a perspective view of the push-in element 1 used in the embodiment shown in FIG. 3 and illustrates that it has a U-shaped profile.

Figure 10:
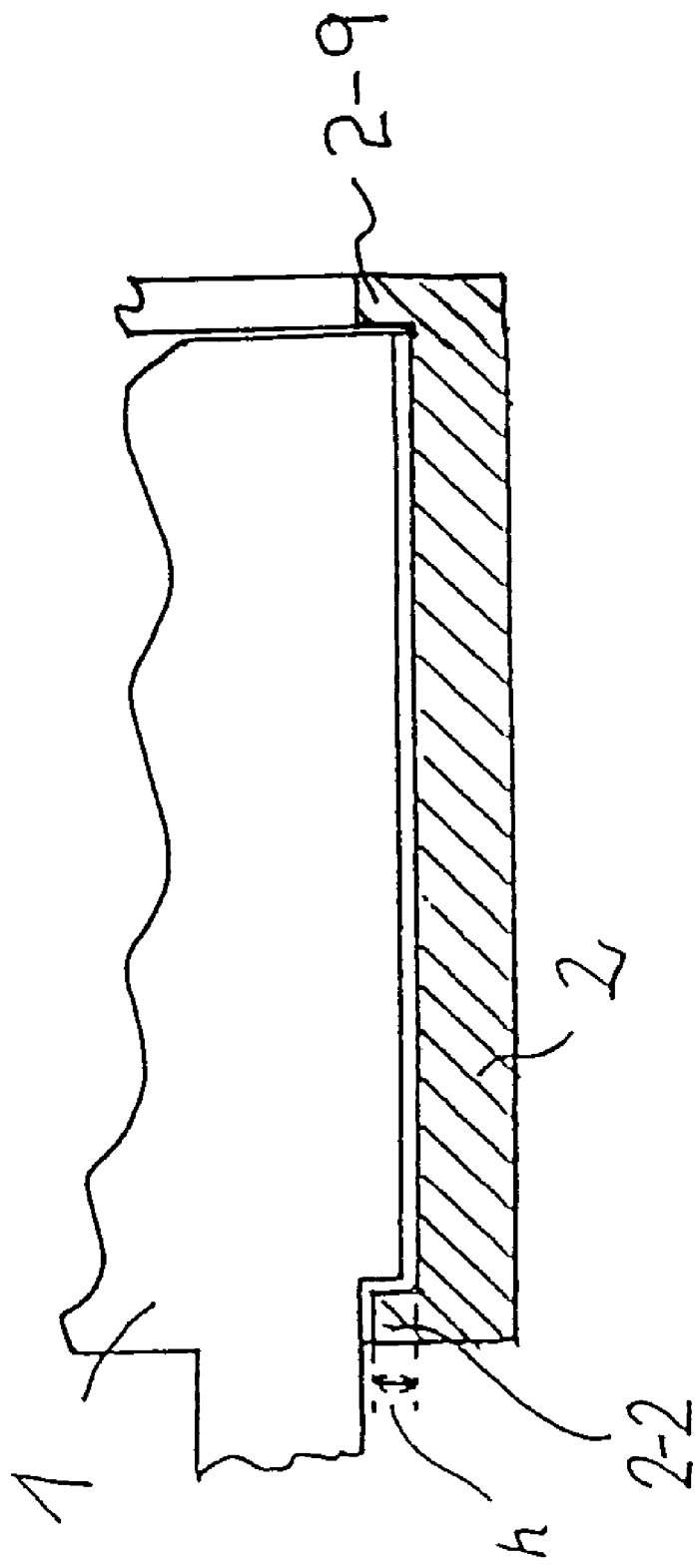
FIG. 10 shows a variation of the receiving member which also utilizes a stop projection to prevent further forward insertion movement of the push-in element.

FIG. 10 shows one non-limiting way in which the push-in part 1 and/or one or more front stop surfaces thereof, engages with one of more front stop surfaces or projections 2-9 on the receiving element 2. In this way, when the push-in part 1 is fully inserted within the receiving member 2, the push-in part 1 is prevented from also being moved substantially along direction D and opposite thereof by the stop surfaces or projections 2-2 and 2-9.

The invention contemplates that the materials for the push-in element 1 and the clearance element 3 can be a plastic, and in particular, a plastic such as e.g., polyetheramide or polyarylamide. These parts are relatively easy to manufacture using, e.g., injection-moulding processes. Other parts may be made of plastic or metal such as, e.g., aluminium.

The arrangement according to the invention shown in, e.g., FIG. 3, possesses the following advantages. It allows for rapid assembly. It has high load-bearing capacity. When locked, the engaging tappet 3-2 is not stressed by the forces acting on the push-in element 1 from the outside. Nor is it stressed by the constant positioning of the push-in element 1 in the receiving member 2 which occurs during frequent removal and insertion of the push-in element 1.

It is noted that the foregoing examples have been provided merely for the purpose of explanation and are in no way to be construed as limiting of the present invention. While the present invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

What is claimed:

1. A detachable locking arrangement comprising:
   a push-in element;
   a receiving member having an insertion opening structured and arranged to receive therein the push-in element;
   a locking device which is removably insertable into a clearance area of the receiving member;
   the clearance area being defined by a space arranged between the push-in element and an inner surface of the receiving member when the push-in element is inserted in the insertion opening;
   the locking device preventing removal of the push-in element from the receiving member when the push-in element is inserted within the insertion opening and when the locking device is inserted into the clearance area, thereby defining a locked position;
   the receiving member comprising a stop mechanism which engages the push-in element so as to prevent the push-in element from moving out of the insertion opening;
   the push-in element being prevented from moving further into the insertion opening along an insertion direction after being inserted in the insertion opening; and further comprising at least one of:
   a projecting shoulder arranged on the receiving member for preventing the push-in element from moving substantially along an insertion direction after the push-in element is inserted within the receiving member due to contact of an end surface of the push-in element against the projecting shoulder; or inwardly projecting guideways arranged on the receiving member for guiding movement of the locking device;

wherein the locking device is movable between an engaged position where it is locked with the receiving member upon insertion and a released position where it is disengaged from the receiving member, and includes a reusable spring member that is releasably engageable to the receiving member, and the spring member includes a locking projection extending outwardly at a free end thereof that engages in an opening in the receiving member automatically upon insertion into the clearance area and is externally releasable via an inward pressure applied to the locking projection or spring member.

2. The arrangement of claim 1, wherein the push-in element comprises at least one tapered surface.

3. The arrangement of claim 1, wherein the receiving member comprises at least one internal tapered surface.

4. The arrangement of claim 1 wherein the push-in element comprises a tapered surface, wherein the receiving member comprises a tapered surface, and wherein the clearance area is defined by a space arranged between the tapered surfaces, whereby the tapered surfaces are oriented at an angle with respect to an insertion direction.

5. The arrangement of claim 1, wherein the locking device is movably mounted to the receiving member and is adapted to move between a retracted position, wherein a stop surface of the locking device engages a stop surface of the receiving member preventing complete removal of the locking device, and the locked position.

6. The arrangement of claim 1, wherein the push-in element is removable from the insertion opening when the locking device is moved out of the locked position.

7. The arrangement of claim 1, wherein the push-in element is removable from the insertion opening when the locking device is moved to a retracted position from the locked position.

8. The arrangement of claim 1, wherein the push-in element is removable from the insertion opening when the locking device is at least partially removed from the clearance area.

9. The arrangement of claim 1, wherein the push-in element is insertable into the insertion opening from one side of the receiving member and the locking device is insertable into the clearance area from another side of the receiving member.

10. The arrangement of claim 1, wherein the push-in element is insertable into the insertion opening from one side of the receiving member and the locking device is insertable into the clearance area from an opposite side of the receiving member.

11. The arrangement of claim 1, wherein the stop mechanism of the receiving member comprises a projecting portion arranged in a beginning area of the insertion opening.

12. The arrangement of claim 11, wherein the projecting portion prevents the push-in element from moving out of the insertion opening after the push-in element passes over the projecting portion.

13. The arrangement of claim 11, wherein the push-in element comprises a stop shoulder which engages with the projecting portion when the push-in element is fully inserted into the insertion opening.

14. The arrangement of claim 1, wherein the receiving member comprises a generally rectangular cross-sectional shape.

15. The arrangement of claim 1 wherein the push-in element comprises a generally rectangular cross-sectional shape.

16. The arrangement of claim 1, wherein the locking projection is moveable between the first, locked position where it engages with the opening of the receiving member, and the second position where it is disengaged through displacing the projection from the opening.

17. The arrangement of claim 16, wherein, in the locked position, the locking device is prevented from moving substantially within the clearance area.

18. The arrangement of claim 17, wherein, when the movable locking projection is disengaged from the opening, the locking device is movable within the clearance area.

19. The arrangement of claim 1, wherein the locking device comprises a generally wedge-shaped member.

20. The arrangement of claim 1, wherein the locking device comprises a generally wedge-shaped plate.

21. The arrangement of claim 1, wherein the locking device comprises generally planar non-parallel surfaces.

22. The arrangement of claim 1, wherein the locking device comprises at least one stop shoulder arranged on a side edge of the locking device.

23. The arrangement of claim 1, wherein the push-in element comprises a step-shaped recess which is structured and arranged to engage with the stop mechanism of the receiving member.

24. The arrangement of claim 23, wherein the stop mechanism is arranged in a beginning area of the insertion opening and wherein the step-shaped recess is arranged in a rear area of the push-in element.

25. The arrangement of claim 1, wherein the push-in element comprises an outwardly projecting portion structured and arranged to contact a front portion of the receiving member when the push-in element is inserted into the receiving opening.

26. The arrangement of claim 1, wherein the receiving member includes a threshold located at a mouth of the insertion opening that extends a height above a bottom surface of the insertion opening, and the push-in element being inserted and moved at least partially downwardly such that a portion of the push-in element is located behind the threshold and is held in position behind the threshold by the locking device.

* * * * *